Dec. 9, 1952 A. D. GARRISON 2,621,117
PREPARATION OF HYDROGEN AND CARBON MONOXIDE GAS MIXTURES
Filed March 11, 1947
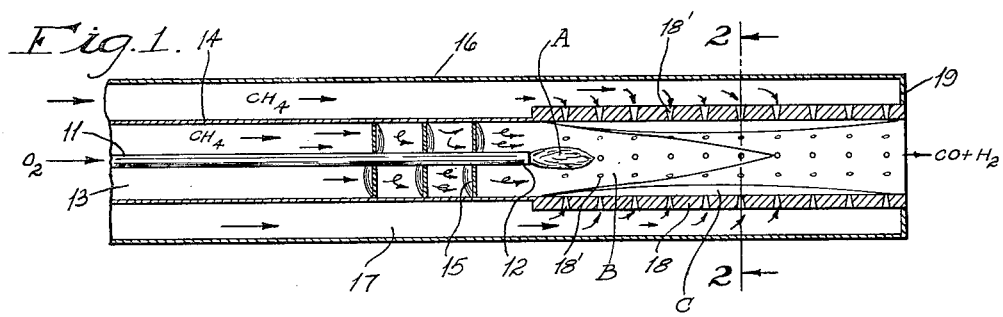
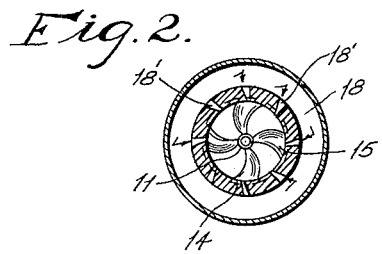
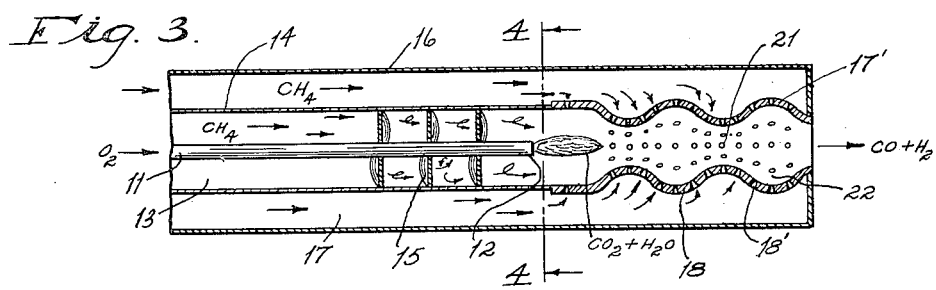
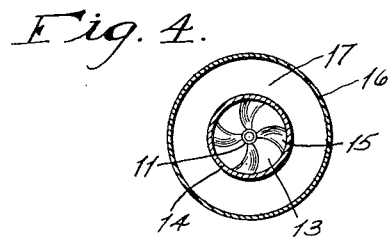
INVENTOR.
ALLEN D. GARRISON
BY Daniel Stryker
ATTORNEY Patented Dec. 9, 1952

2,621,117

UNITED STATES PATENT OFFICE 2,621,117

PREPARATION OF HYDROGEN AND CARBON MONOXIDE GAS MIXTURES

Allen D. Garrison, Houston, Tex., assignor to Texaco Development Corporation, New York, N. Y., a corporation of Delaware Application March 11, 1947, Serial No. 733,838

8 Claims. (Cl. 48—196)

This invention relates to the preparation of gas mixtures of predetermined constituents in predetermined proportions, and more particularly to the prepaartion of so-called synthesis gas, consisting essentially of carbon monoxide and hydrogen, for the synthesis of hydrocarbons, oxygenated compounds and the like.

It is an object of this invention to provide a novel process for preparing such gas mixtures from an oxygen-containing gas and a hydrocarbon wherein the reactants are brought into intimate contact with one another for reacting purposes, the products of the reaction being immediately contacted while in a highly energized state with additional reactant to provide other reaction products.

A further object of the invention is the provision of a novel process and apparatus for effecting the intimate contact of a plurality of reactants in a series of reactions of both the exothermic and endothermic type, the reactants being so charged that the products of one reaction are subjected to intimate contact with additional reactant immediately upon formation and while in a highly energized state, and substantially the full amount of heat generated in the exothermic reactions is immediately available without loss for the endothermic reactions.

Still a further object of the invention is the provision of a novel process and apparatus wherein a succession of reactants are caused to react with one another while substantially surrounded by reactant material whereby intimate contact of all the reactants is insured, and the heat developed in exothermic reactions can escape only through the surrounding reactants where it is absorbed and made available for endothermic reactions.

Other objects and advantages of the invention will appear from the following description and claims taken in connection with the attached drawing, wherein:

Fig. 1 is a diagrammatic showing of an axial section through a portion of a generator showing a preferred embodiment of the invention.

Fig. 2 is a section taken on the line 2—2 of Fig. 1.

Fig. 3 is a view similar to Fig. 1 of a modification.

Fig. 4 is a section taken on the line 4—4 of Fig. 3.

In brief, the present invention envisages the introduction of a reactant into a generating zone in concentric relation to another reactant, the reaction of the two reactants with the production of reaction products, the continued and immediate envelopment of the reaction products with additional reactant, and their reaction with the final production of the desired gas mixture. More particularly, the present invention involves the injection of a reactant such as oxygen into a generating zone, the envelopment of the oxygen with a whirling or spiraling stream of hydrocarbon, the reaction of the same with the generation of a whirling or spiraling stream of reaction products, the continued and immediate envelopment of the reaction products by a stream of additional reactant, preferably traveling in a direction generally normal to the axis of flow of the reaction products and generally spiraling in a direction opposite in rotation to the spiral path of the stream of reaction products to ensure intimate mixture therewith, and the withdrawal of the final reaction products. To further the intimate mixture and consequent reaction of the additional reactant and the first reaction products, the combined stream resulting from mixture thereof is preferably subjected to a series of alternate expansions and contractions.

For the purpose of illustration only and not by way of limitation, the invention is described in connection with a generator for the preparation of synthesis gas for synthesis of hydrocarbons, oxygenated compounds and the like, consisting essentially of carbon monoxide and hydrogen in the approximate mol proportion of 1 to 2, respectively. The starting reactants are preferably a hydrocarbon, either in liquid or gaseous form, usually natural gas consisting chiefly of methane, and an oxygen-containing gas, hereinafter referred to as oxygen containing from 90–99 per cent pure oxygen.

Referring to Fig. 1 which illustrates a portion of a generator, one of the reactants, such as oxygen, is introduced through a conduit 11 of a suitable metal or refractory material, the oxygen being discharged and expanded at the right end through a nozzle 12 secured to the end of the conduit. The oxygen is introduced at a pressure of about 15 to 250 pounds per square inch gauge, preferably at a pressure slightly above the pressure to be used in any subsequent application or utilization of the product gas, such as the synthesis of hydrocarbons, oxygenated compounds and the like, to avoid intermediate handling steps such as cooling, compressing and preheating. The oxygen is preferably preheated to a temperature in the neighborhood of 800° F. A second passage 13 is formed by a tube 14 of suitable metal or refractory, tube 14 being generally disposed concentric of conduit 11 to define annular passage 13 about conduit 11. A series of inclined vanes or blades 15 are preferably positioned in the annular passage to impart a spiral or wormlike motion to the gas passing therethrough. Thus, when the gas, such as methane, is charged to conduit 13 at about the same pressure as the oxygen, it issues about nozzle 12 in a generally spiral path and in a mass completely enveloping the issuing oxygen. The methane is charged through conduit 13 at a predetermined molar rate, depending on the size of the equipment, this proportion of the methane being about 20 to 30 per cent, preferably about 25 per cent, of the total methane feed. The oxygen is charged at a molar rate of about 45 to 60 per cent of the total methane eventually employed in the process, preferably about 50 to 55 per cent, it being desirable to use an excess of about 5 to 20 per cent to insure substantially complete consumption of the methane.

A third concentric tube 16 is positioned about conduit 14 to define an annular passage 17 into which the remaining methane, i. e. about 70 to 80 per cent, preferably about 75 per cent, of the total methane utilized, is charged at a pressure of about 20 to 300 pounds per square inch gauge, the pressure being sufficiently above those of the other gases to insure the methane flowing in the manner hereinafter described. Tube 14 from a point behind or adjacent nozzle 12 to the end of the assembly is formed with a porous or perforated section 18 formed of a suitable refractory, such as alundum. Section 18 is provided with pores through which the methane may diffuse into passage 13, or it may be formed with a plurality of apertures 18', angled as shown in Fig. 2 so that the issuing gas is given a generally spiral motion, the rotary direction of the spiral path being preferably opposite to that of the methane passing by vanes 15. In any case, the direction of flow of the methane through section 18 is generally normal to the axis of the gas flow through passage 13. The right end of passage 17 is closed as by an end wall 19. The methane introduced through passages 13 and 17 is preferably preheated to about 1000° F.

For the preparation of so-called synthesis gas having a ratio of CO to $H_2$ of about 1 to 2, the total methane feed as related to the oxygen is such that the ratio of the atomic amounts of oxygen to carbon (O/C) is about 1.

In operation, the oxygen fed through conduit 11 issues from nozzle 12 and is immediately surrounded in its continued path by a spiraling stream of methane from passage 13. Reaction of the two reactants is initiated by suitable ignition means such as an electric spark, not shown, the reaction proceeding generally to the formation of such reaction products as carbon dioxide and water. Such products of reaction continue in a spiral path to the right as viewed in Fig. 1. They are immediately surrounded and become initially mixed with methane charged through apertures 18' or the pores in section 18, an additional reaction taking place with the resultant production of the desired carbon monoxide and hydrogen. Both the initial reaction and the subsequent reaction take place at the maximum flame temperatures possible under the conditions of operation and feed amounts. With the arrangement shown, the elements including the nozzle or burner 12 require little or no cooling as contrasted with prior arrangements requiring cooling by water and like mediums.

The initial reaction between the oxygen and the methane charged through passage 13 is essentially exothermic, the oxygen being in an amount to effect a complete reaction of the methane, and the reaction between the additional methane and the reaction products of the first reaction is essentially endothermic. Because of the virtual envelopment of the oxygen by methane and the like envelopment of the reaction products therefrom by methane, there is substantially no loss of the heat developed in the exothermic reaction, and it is made immediately and substantially completely available for the endothermic reaction.

The envelopment and immediate contact of the first reaction products by the methane from passage 17 is also of advantage since the reaction products are contacted immediately upon their formation and while in a highly energized and activated state whereby the reaction takes place at a high rate and is more complete.

Fig. 3 illustrates a modification wherein section 18 is shaped to provide a series 21 of sections of reduced cross-section and a series 22 of alternate sections of enlarged cross-section whereby the stream of products of reaction of the oxygen and first portion of methane and the additional methane are subjected to alternate expansion and contraction phases, thereby causing the several reactants to mix more thoroughly.

In each case the final products of reaction are withdrawn from the right end of the assembly and charged to either a storage facility, a synthesis reactor or other place of use. If desired, the gases can be cooled to prevent the development of any undesired secondary reactions.

It will be noted that in the present process, the hot and activated products of the first reaction, namely $CO_2$ and $H_2O$, pass as a cone through a sheath of methane. The higher temperature level may be said to be confined to the inner cone of oxygen, activated $CO_2$, and activated $H_2O$ so that the surrounding cooler methane has less tendency to crack to carbon before its reaction. The possibility of backfire is substantially eliminated and there is no opportunity for the activated components of the inner cone to contact the surrounding solid wall which would catalyze the deactivation. The only possible contact of the activated molecules is with the surrounding sheath of methane.

This is believed evident from Fig. 1 where A represents the entering oxygen, B the cone of activated $CO_2$ and $H_2O$, and C the surrounding sheath of methane. Thus the distribution of gases is highly favorable to completion of the reaction. The activated gases can contact only methane. Furthermore the methane, which is approximately twice the volume of the oxygen required, is the gas which is in the position to be preheated and is advancing uniformly from all directions toward the flame zone.

This action is in decided contrast to the injection of oxygen into a large surrounding body of methane where there will be convection currents functioning to recycle some of the CO and $H_2$ which has undergone the endothermic reaction and has passed along or close to the relatively cool walls of the reactor. Such recycle is undesirable since it causes dilution of the reacting gases and tends to deactivate the activated $CO_2$ and $H_2O$ before complete contact with the methane.

While the invention has been described in connection with the preparation of synthesis gas for synthesis of hydrocarbons, oxygenated compounds and the like, it is to be understood that by varying the conditions of the process such as the types and proportions of reactants fed, the amount of preheat and the pressure, gas mixtures of other compositions may be provided. It is also to be understood that with apertures 18' of sufficient size, powdered carbonaceous fuels such as coal, coke, lignite, etc. may be used in lieu of liquid or gaseous hydrocarbons, the term "carbonaceous reactant" as used herein including gaseous, liquid and solid hydrocarbons and carbonaceous materials such as coal, coke, lignite, etc. capable of reacting with oxygen to produce final gas mixtures of the desired compositions. If desired, different carbonaceous reactants may be charged to passages 13 and 17, depending upon the final products desired.

Obviously many modifications and variations of the invention as hereinbefore set forth, may be made without departing from the spirit and scope thereof, only such limitations should be imposed as are indicated in the appended claims.

I claim:

1. In a process for the production of a gas comprising carbon monoxide by reaction of a carbonaceous reactant with oxygen, the improvement which comprises the steps of charging a stream of oxygen-containing gas to a reaction zone, charging a stream of carbonaceous reactant to said reaction zone annularly about said oxygen stream to surround said oxygen and in sufficient amount to react with substantially all of the oxygen with the formation of completely oxidized reaction products, charging an additional stream of carbonaceous reactant to said reaction zone annularly about the zone of reaction of oxygen with the first stream of carbonaceous reactant and into intimate contact with said reaction products immediately following their formation to react therewith and form a final product gas comprising carbon monoxide, and withdrawing the resultant product gas from the reaction zone.

2. In a process for the production of a gas comprising carbon monoxide by reaction of a carbonaceous reactant with oxygen, the improvement which comprises the steps of charging a stream of oxygen-containing gas to a reaction zone, charging a stream of carbonaceous reactant to said reaction zone annularly about said oxygen stream to surround said oxygen and in sufficient amount to react with substantially all of the oxygen with the formation of completely oxidized reaction products, thereafter charging an additional stream of carbonaceous reactant to said reaction zone annularly about the zone of reaction of the first stream of carbonaceous reactant with oxygen and into intimate contact with said reaction products immediately following their formation to react therewith and form a final product gas comprising carbon monoxide, effecting alternate expansion and contraction of the resulting stream of gases to effect intermixing thereof, and withdrawing the resultant product gas comprising carbon monoxide from the reaction zone.

3. A process for the production of carbon monoxide and hydrogen by reaction of a hydrocarbon with oxygen which comprises the steps of charging a stream of oxygen-containing gas to a reaction zone, charging a stream of hydrocarbon to said reaction zone annularly about said stream of oxygen-containing gas and in sufficient amount to react with substantially all of the oxygen in said oxygen-containing gas stream with the formation of carbon dioxide and water vapor, thereafter intimately contacting the carbon dioxide and water vapor immediately following their formation with additional hydrocarbon supplied as a stream annularly about the stream of carbon dioxide and water vapor to react therewith and form a gaseous mixture of carbon monoxide and hydrogen, and withdrawing said gaseous mixture from the reaction zone.

4. A process for the production of carbon monoxide and hydrogen by reaction of a hydrocarbon with oxygen, which comprises the steps of charging a stream of oxygen-containing gas to a reaction zone, charging a stream of hydrocarbon to said reaction zone annularly about said stream of oxygen-containing gas and in sufficient amount to react with substantially all of the oxygen in said oxygen-containing gas stream with the formation of carbon dioxide and water vapor, charging an additional stream of hydrocarbon to said reaction zone annularly about the resulting stream of carbon dioxide and water vapor and into intimate contact with said carbon dioxide and water vapor immediately following their formation to react therewith to form carbon monoxide and hydrogen, effecting alternate expansion and contraction of the resulting stream of gases to effect intermixing thereof, and withdrawing the gaseous product comprising carbon monoxide and hydrogen from the reaction zone.

5. A process for the production of a mixture of carbon monoxide and hydrogen by reaction of a hydrocarbon with oxygen which comprises the steps of charging a stream of oxygen-containing gas to a reaction zone, charging a stream of hydrocarbon to said reaction zone annularly about said oxygen stream in a spiral manner therearound and in sufficient amount to react with substantially all of the oxygen with the formation of carbon dioxide and water vapor as the principal reaction products, charging additional hydrocarbon in an annular stream about the resulting stream of carbon dioxide and water vapor into intimate contact with said carbon dioxide and water vapor immediately following their formation while simultaneously following a generally spiral path therearound and reacting therewith to form carbon monoxide and hydrogen, and withdrawing said product carbon monoxide and hydrogen from the reaction zone.

6. The process as defined in claim 5 wherein the spiral path followed by said additional hydrocarbon is in the opposite direction from the spiral path followed by the first stream of hydrocarbon.

7. The process as defined in claim 5 wherein the stream of carbon dioxide and water vapor and additional hydrocarbon is alternately expanded and contracted to effect intermixing thereof.

8. A process for the production of carbon monoxide and hydrogen by the reaction of a hydrocarbon with oxygen which comprises the steps of charging a stream of oxygen to a reaction zone at a predetermined molar rate, charging a stream of methane to said reaction zone annularly about said stream of oxygen at a molar rate of approximately one-half the molar rate of the oxygen effecting reaction therewith with the formation of reaction products consisting essentially of carbon dioxide and water vapor, charging an additional stream of methane annularly about the stream of carbon dioxide and water vapor to laterally envelop said stream of carbon dioxide and water vapor into intimate contact therewith immediately following their formation and in a molar rate of about one and one-half times the molar rate of the oxygen to react with said carbon dioxide and water vapor to form carbon monoxide and hydrogen, and withdrawing the resulting carbon monoxide and hydrogen from the reaction zone.

ALLEN D. GARRISON.

REFERENCES CITED

The following references are of record in the file of this patent:

UNITED STATES PATENTS

| Number | Name | Date |
|---|---|---|
| 166,036 | Spencer | July 27, 1875 |
| 866,525 | Seely et al. | Sept. 17, 1907 |
| 1,954,991 | Garner et al. | Apr. 17, 1934 |
| 1,971,728 | Perry | Aug. 28, 1934 |
| 2,054,734 | Akast et al. | Sept. 15, 1936 |
| 2,129,269 | Furlong | Sept. 6, 1938 |
| 2,153,951 | Barber | Apr. 11, 1939 |
| 2,302,156 | Totzek | Nov. 17, 1942 |
| 2,343,866 | Hincke | Mar. 14, 1944 |
| 2,398,654 | Lubbock et al. | Apr. 16, 1946 |
| 2,486,879 | Rees et al. | Nov. 1, 1949 |
| 2,493,454 | Hagy | Jan. 3, 1950 |
| 2,552,737 | Rees | May 15, 1951 |